April 9, 1963     R. F. BEEHLER     3,084,963

RESILIENT FAN HUB ASSEMBLY

Filed July 29, 1960

INVENTOR.
RICHARD F. BEEHLER
BY
*Lockwood, Woodard, Smith & Weikart*
ATTORNEYS

United States Patent Office 3,084,963
Patented Apr. 9, 1963

3,084,963
RESILIENT FAN HUB ASSEMBLY
Richard F. Beehler, Indianapolis, Ind., assignor, by mesne assignments, to The Lau Blower Company, Dayton, Ohio, a corporation of Ohio
Filed July 29, 1960, Ser. No. 46,159
10 Claims. (Cl. 287—20)

This invention relates generally to hub assemblies for shaft mounting of rotated elements and in particular to a hub assembly for resiliently mounting an air moving fan upon a drive shaft.

In mounting fan blades or the like for moving air, it has become conventional to couple the fan to its drive shaft by means of a hub assembly which utilizes one or more elements of relatively soft, resilient material such as rubber. This type of mounting effectively isolates motor vibration and noise, particularly A.C. hum, from the propeller or fan blades and generally produces more satisfactory fan operation.

However, there are problems encountered with this conventional type of fan hub assembly. One of these difficulties involves holding the central plane of the spider on which the blades are mounted precisely perpendicular to the axis of the driving shaft. Any appreciable deviation from this perpendicular relation results in unstabilized operation of the fan and a high noise level. Displacement of the spider out of proper relationship with the shaft axis can easily occur if final assembly of the hub places non-symmetric compressive forces on the spider. If the resilient elements are clamped under excessive forces, they are distorted and may flow non-symmetrically and result in cocking the spider out of perpendicular relation with the shaft axis. Any excessive compression or distorting of the resilient elements also results in material lowering of their damping effect. In some prior art structures the hub assembly is completed by rolling over the end of an inner sleeve to lock the assembly together. Since precise control of the degree of roll-over is difficult to attain and since the body of the inner sleeve tends to collapse somewhat during the roll-over operation, the magnitude of the compressive, distorting force applied to the resilient elements has been difficult to control. In general, further, the prior art structures have been characterized by a relatively large number of parts which are time consuming to orient and assemble and which do not therefore lend themselves to low-cost mass production.

The primary object of the present invention is to provide a hub assembly of the type referred to in which the component parts are positively interlocked against rotation relative to each other.

A further object of the present invention is to provide a hub assembly of the type referred to characterized by a minimum of non-duplicate parts which lend themselves to simple and convenient assembly.

A further object of the present invention is to provide a hub assembly of the type referred to capable of relatively high torque rating with a minimum of compression or distortion of the resilient elements.

A further object of the present invention is to provide a hub assembly of the type referred to which is adapted to accommodate spiders or other driven elements of various thickness.

A further object of the present invention is to provide a hub assembly of the type referred to having means for controlling or limiting the compressive forces acting on the resilient elements after the hub is assembled to thereby provide the hub assembly with improved, uniform vibration damping characteristics.

The full nature of the invention will be understood from the accompanying drawings and the following description and the claims:

Figure 1:
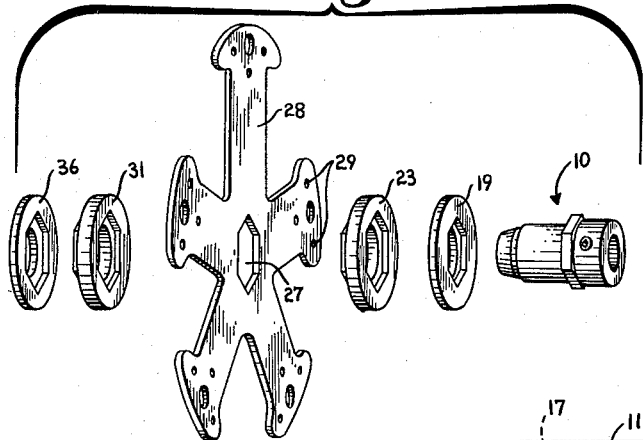
FIG. 1 is an exploded, perspective view of the components of the hub assembly.
Figure 2:
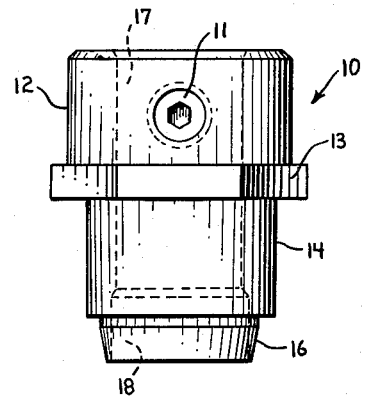
FIG. 2 is a side view of the inner sleeve or shaft accommodating component.
Figure 3:
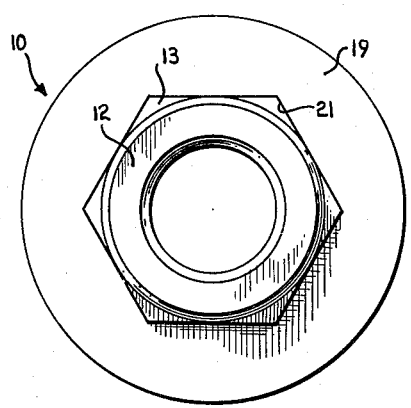
FIG. 3 is an end view of the hub assembly.

Referring to the drawings, the hub assembly includes an inner sleeve component shown generally at 10 which is provided with a radially threaded aperture accommodating a set screw 11 (FIG. 2) which provides a means for locking the component 10 upon a drive shaft (not shown). The component 10 has an end portion 12 of substantial radial thickness which terminates at a hexagonal flange 13. A shank 14 of reduced diameter extends from the flange 13 and terminates at a somewhat tapered, thin walled section 16. The central bore 17 through the component 10 is of uniform circular cross sectional configuration throughout its length except for the portion 18 which is of somewhat enlarged inside diameter.

The component 10 receives a rigid, metal washer, or plate 19 which has a central aperture therein sized for freely accommodating the shank portion 14 of the sleeve 10. The central portion of the washer 19 is offset so as to provide a hexagonally shaped depression 21 and a hexagonally shaped boss 22. It will be noted that this hexagonal depression and corresponding boss may be formed on the washer 19 by a single stamping operation. The hexagonal depression 21 in the washer is sized so as to acommodate rather closely the hexagonal flange 13 on the sleeve 10.

The shank 14 of the sleeve 10 also accommodates an annular resilient element 23. The resilient element may be formed of any suitable resilient material such as natural or synthetic rubber and is molded so as to be provided with a hexagonal depression 24 and a hexagonal boss 26. When in place on the shank 14, the hexagonal boss 22 of the washer 19 fits snugly within the hexagonal depression 24 formed on the resilient element 23. The hexagonal boss 22 is sized so as to be accommodated in the hexagonal central aperture 27 in a blade mounting spider 28. Aside from its hexagonal central aperture 27, the spider 28 is of conventional form and carries apertures 29 for conveniently mounting fan blades to the spider. It will be noted that the axial length of the boss 26 is such that it extends through and beyond the spider 28 which is of conventional thickness dimension.

Figure 4:
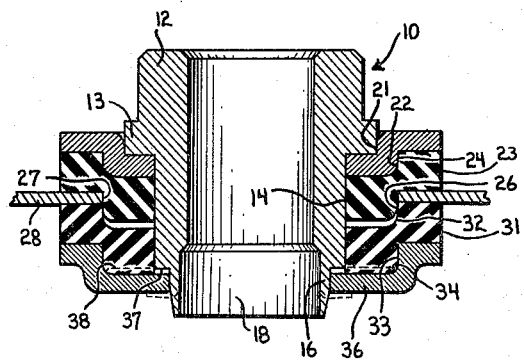
FIG. 4 is a side sectional view of the hub assembly.

Adjacent the spider 28 is a second resilient element 31 which is in all respects identical to the resilient element 23. The hexagonal depression 32 in the element 31 accommodates the extending end portion of the hexagonal boss 26 of the element 23, and the annular marginal area of the element 31 engages the adjacent face of the spider 28. The element 31 is provided with a hexagonal boss 33 which extends into a hexagonal depression 34 formed in an end washer or plate 36. The rigid metal washer 36 may be formed by a single stamping operation and is provided with a central circular aperture sized so as to accommodate the reduced diameter end portion 16 of the sleeve 10. As may best be seen in FIG. 4, the junction between the shank portion 14 and the end portion 16 of the sleeve is defined by an annular shoulder 37. This shoulder limits the depth of insertion of the sleeve portion 16 into the central aperture in the washer 36 and thus limits the amount of compression applied to the resilient elements 31 and 23 when the assembly is completed. Compression of the assembly is accomplished by rolling over the extending end of the sleeve portion 16 as indicated by broken lines in FIG. 4. When this operation is completed, the washer 36 will be moved against the shoulder 37 and will be in a position defined by the broken lines 38 in FIG. 4.

In operation, the hub assembly may be locked upon a drive shaft by means of the set screw 11, and rotation of the shaft will be transferred to the spider 28 and the fan blades carried thereby. It will be noted that the assembly is locked axially between the hexagonal flange 13 and the rolled-over end portion 16. The sleeve component 10 is rotationally locked to the washer 19 by means of their cooperating hexagonal surfaces. The resilient element 23 and the washer 19 are similarly rotationally locked together. The extension of the hexagonal boss 26 of the washer 23 through the hexagonal central aperture in the spider 28 rotationally locks the spider to the element 23. The extension of the hexagonal boss 26 of the element 23 into the hexagonal depression 32 in the element 31 rotationally locks the two resilient elements together, and the cooperation of the hexagonal surfaces 33 and 34 of the element 31 and washer 36, respectively, further rotationally locks the element 31 to the preceding components. The inner marginal area of the washer 36 is, of course, clamped between the shoulder 37 and the rolled-over end portion 16 of the sleeve 10.

It may thus be seen that all of the components are positively locked to each other and that a stable drive to the spider is thereby provided. The amount of distortion or compression of the resilient elements is controlled by the shoulder 37, and the vibration damping characteristics of the resilient elements is thus retained at a maximum. Because of the interlocking of the parts by means of the hexagonal depressions and bosses, the resilient elements may be formed of relatively soft rubber, thereby having excellent damping characteristics, and yet a high torque rating may be retained by the assembly. The washers 19 and 36 may be simply formed by a single stamping operation and the resilient elements themselves are identical in configuration so that stocking problems are greatly reduced.

Because the hexagonal boss 26 in the resilient element 23 extends appreciably beyond the spider 28, spider structures of various thickness dimension may be accommodated in the assembly. It will be noted that the portion of the resilient element 23 extending through the spider is accommodated in the corresponding depression in the resilient element 31 and is not distorted or compressed when the assembly of the composite structure is completed.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

I claim:

1. A hub assembly for mounting a propeller element on a rotating shaft comprising a shaft receiving sleeve having a hexagonal flange and a shank portion, said sleeve having a terminal portion of reduced outside diameter whereby the junction of said terminal portion and said shank portion provide an annular shoulder on said sleeve, a first rigid plate having a central aperture receiving said sleeve shank portion, the central area of said plate being offset to provide a hexagonal depression and a corresponding hexagonal boss on opposite sides of the plate, said hexagonal depression receiving said sleeve flange, two identical resilient members having a generally annular configuration and received upon said sleeve shank portion, the central areas of said resilient members being offset to provide a hexagonal boss and depression on opposite sides of said members, the depression in one of said members receiving said first plate boss, a propeller blade mounting spider having a hexagonal central aperture therein receiving the boss of said one resilient member, the portion of said one resilient member boss extending beyond said spider aperture being received in the depression in said other resilient member, and a second rigid plate having an aperture therethrough closely accommodating said sleeve terminal portion, said second plate having a central hexagonal depression therein accommodating the boss of said other resilient member, said sleeve terminal portion being deformed at its free end to clamp said plates, resilient members and spider in stacked relation on said sleeve and locked against relative rotation, the magnitude of compressive forces exerted on said resilient members being limited by the engagement of said second plate with said annular shoulder on said sleeve.

2. A hub assembly for mounting a propeller element on a rotating shaft comprising a shaft receiving sleeve having a polygonal flange and a shank portion, said sleeve having a terminal portion of reduced outside diameter whereby the junction of said terminal portion and said shank portion provide an annular shoulder on said sleeve, a first rigid plate having a central aperture receiving said sleeve shank portion, the central area of said plate being offset to provide a polygonal depression and a corresponding polygonal boss on opposite sides of the plate, said polygonal depression receiving said sleeve flange, two identical resilient members having a generally annular configuration and received upon said sleeve shank portion, the central areas of said resilient members being offset to provide a polygonal boss and depression on opposite sides of said members, the depression in one of said members receiving said first plate boss, a propeller blade mounting spider having a polygonal central aperture therein receiving the boss of said one resilient member, the portion of said one resilient member boss extending beyond said spider aperture being received in the depression in said other resilient member, and a second rigid plate having an aperture therethrough closely accommodating said sleeve terminal portion, said second plate having a central polygonal depression therein accommodating the boss of said other resilient member, said sleeve terminal portion being deformed at its free end to clamp said plates, resilient members and spiders in stacked relation on said sleeve and locked against relative rotation, the magnitude of compressive forces exerted on said resilient members being limited by the engagement of said second plate with said annular shoulder on said sleeve.

3. A hub assembly for mounting a propeller element on a rotating shaft comprising a shaft receiving sleeve having a polygonal flange and a shank portion, said sleeve having a terminal portion of reduced outside diameter whereby the junction of said terminal portion and said shank portion provide an annular shoulder on said sleeve, a first rigid plate having a central aperture receiving said sleeve shank portion, said plate having a polygonal depression and a corresponding polygonal boss on opposite sides thereof, said polygonal depression receiving said sleeve flange, two resilient members having a generally annular configuration and received upon said sleeve shank portion, said resilient members each having a polygonal boss and depression on opposite sides thereof, the depression in one of said members receiving said first plate boss, a propeller blade mounting spider having a polygonal central aperture therein receiving the boss of said one resilient member, the portion of said one resilient member boss extending beyond said spider aperture being received in the depression in said other resilient member, and a second rigid plate having an aperture therethrough closely accommodating said sleeve terminal portion, said second plate having a central polygonal depression therein accommodating the boss of said other resilient member, said sleeve terminal portion being deformed at its free end to clamp said plates, resilient members and spider in stacked relation on said sleeve and locked against relative rotation, the magnitude of compressive forces exerted on said resilient members being limited by the engagement of said second plate with said annular shoulder on said sleeve.

4. A hub assembly for mounting a propeller element on a rotating shaft comprising a shaft receiving sleeve having a polygonal flange and a shank portion, said sleeve having a terminal portion of reduced outside diameter whereby the junction of said terminal portion and said shank portion provide an annular shoulder on said sleeve, a first rigid plate having a central aperture receiving said sleeve shank portion, said plate having a polygonal depression and a corresponding polygonal boss on opposite sides thereof, said polygonal depression receiving said sleeve flange, two resilient members having a generally annular configuration and received upon said sleeve shank portion, said resilient members each having a polygonal boss and depression on opposite sides thereof, the depression in one of said members receiving said first plate boss, a propeller blade mounting spider having a polygonal central aperture therein receiving the boss of said one resilient member, the portion of said one resilient member boss extending beyond said spider aperture being received in the depression in said other resilient member, and a second rigid plate having an aperture therethrough closely accommodating said sleeve terminal portion, said second plate having a central polygonal depression therein accommodating the boss of said other resilient member, and means for clamping said plates, resilient members and spider in stacked relation on said sleeve and locked against relative rotation, the magnitude of compressive forces exerted on said resilient members being limited by the engagement of said second plate with said annular shoulder on said sleeve.

5. A hub assembly for mounting a propeller element on a rotating shaft comprising a shaft receiving sleeve having a polygonal flange and an abutment with a shank portion extending therebetween, a first rigid plate having a central aperture receiving said sleeve shank portion, said plate having a polygonal depression and a corresponding polygonal boss on opposite sides thereof, said polygonal depression receiving said sleeve flange, two resilient members having a generally annular configuration and received upon said sleeve shank portion, said resilient members each having a polygonal boss and depression on opposite sides thereof, the depression in one of said members receiving said first plate boss, a propeller blade mounting spider having a polygonal central aperture therein receiving the boss of said one resilient member, the portion of said one resilient member boss extending beyond said spider aperture being received in the depression in said other resilient member, and a second rigid plate having an aperture therethrough closely accommodating said sleeve terminal portion, said second plate having a central polygonal depression therein accommodating the boss of said other resilient member, and means for clamping said plates, resilient members and spider in stacked relation on said sleeve and locked against relative rotation, the magnitude of compressive forces exerted on said resilient members being limited by the engagement of said second plate with said abutment on said sleeve.

6. A hub assembly for mounting a propeller element on a rotating shaft comprising a shaft receiving sleeve having a polygonal flange and an abutment with a shank portion extending therebetween, a first rigid plate having a central aperture receiving said sleeve shank portion, said plate having a polygonal depression and a corresponding polygonal boss on opposite sides thereof, said polygonal depression receiving said sleeve flange, two resilient members having a generally annular configuration and received upon said sleeve shank portion, said resilient members each having a polygonal boss and depression on opposite sides thereof, the depression in one of said members receiving said first plate boss, a propeller blade mounting spider having a polygonal central aperture therein receiving the boss of said one resilient member, and a second rigid plate having an aperture therethrough closely accommodating said sleeve terminal portion, said second plate having a central polygonal depression therein accommodating the boss of said other resilient member, and means for clamping said plates, resilient members and spider in stacked relation on said sleeve, the magnitude of compressive forces exerted on said resilient members being limited by the engagement of said second plate with said abutment on said sleeve.

7. A hub assembly for mounting a driven element on a drive shaft comprising a sleeve adapted to be locked on the shaft, a collar means rigid with said sleeve and including a non-circular boss portion extending axially from said collar, a first resilient disk member on said sleeve including a non-circular socket portion on one side thereof complementary to said non-circular boss portion of said collar means and a non-circular boss portion projecting axially from the other side thereof, said driven element having a non-circular center opening complementary to and adapted to receive said non-circular boss portion of said first resilient disk, a second resilient disk on said sleeve of substantially the same configuration as said first resilient disk engaged in telescoping relation therewith and clamping said driven element against said first disk, a rigid plate on said sleeve adjacent said second disk, and means on said sleeve maintaining said plate in clamping relation with said disks and with respect to said collar means.

8. A hub assembly for mounting a driven element on a drive shaft comprising a sleeve adapted to be locked on the shaft, a collar means rigid with said sleeve and including a non-circular boss portion extending axially from said collar, a first resilient disk member on said sleeve including a non-circular socket portion on one side thereof complementary to said non-circular boss portion of said collar means and a non-circular boss portion projecting axially from the other side thereof, said driven element having a non-circular center opening complementary to and adapted to receive said non-circular boss portion of said first resilient disk, a second resilient disk on said sleeve of substantially the same configuration as said first resilient disk engaged in telescoping relation therewith and clamping said driven element against said first disk, a rigid plate on said sleeve adjacent said second disk, means on said sleeve maintaining said plate in clamping relation with said disks and with respect to said collar means, and means limiting the pressure exerted by said plate on said disks.

9. A hub assembly for mounting a driven element on a drive shaft comprising a sleeve adapted to be locked on the shaft, a collar means rigid with said sleeve and including a non-circular boss portion extending axially from said collar, a first resilient disk member on said sleeve including a non-circular socket portion on one side thereof complementary to said non-circular boss portion of said collar means and a non-circular boss portion projecting axially from the other side thereof, said driven element having a non-circular center opening complementary to and adapted to receive said non-circular boss portion of said first resilient disk, a second resilient disk on said sleeve of substantially the same configuration as said first resilient disk engaged in telescoping relation therewith and clamping said driven element against said first disk, a rigid plate on said sleeve adjacent said second disk, means on said sleeve maintaining said plate in clamping relation with said disks and with respect to said collar means, and an abutment on said sleeve forming a stop limiting the axial movement of said plate toward said second disk.

10. A hub assembly for mounting a driven element on a drive shaft comprising a sleeve adapted to be locked on the shaft, collar means rigid with said sleeve and including a non-circular radially inner portion and a radially outer portion offset axially from said non-circular portion, a resilient disk member of substantially the same outer diameter as said collar means and including a non-circular socket portion on one side thereof complementary to said non-circular portion of said collar means and a non-circular radially inner portion projecting axially away from said collar means, said driven element having a non-circular center opening complementary to and adapted to receive said non-circular portion of said resilient disk, a second resilient disk of substantially the same configuration as said first resilient disk engaged in telescoping relation therewith and clamping said driven element against said first disk, a rigid plate of substantially the same configuration as said disks received in telescoping relation with said second disk, and means on said sleeve maintaining said plate in clamping relation with said disks and with respect to said collar means.

References Cited in the file of this patent
UNITED STATES PATENTS 2,773,365   Delf et al. _____ Dec. 11, 1956